US011292189B2

(12) United States Patent
Van Brocklin et al.

(10) Patent No.: US 11,292,189 B2
(45) Date of Patent: Apr. 5, 2022

(54) THREE-DIMENSIONAL PRINTING

(71) Applicant: HEWLETT-PACKARD DEVELOPMENT COMPANY, L.P., Spring, TX (US)

(72) Inventors: Andrew Van Brocklin, Corvallis, OR (US); Kevin P. DeKam, Corvallis, OR (US); Vladek Kasperchik, Corvallis, OR (US); Johnathon Holroyd, Corvallis, OR (US); Douglas Pederson, Corvallis, OR (US); Sterling Chaffins, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 22 days.

(21) Appl. No.: 16/488,715

(22) PCT Filed: Nov. 17, 2017

(86) PCT No.: PCT/US2017/062327
§ 371 (c)(1),
(2) Date: Aug. 26, 2019

(87) PCT Pub. No.: WO2019/099029
PCT Pub. Date: May 23, 2019

(65) Prior Publication Data
US 2021/0283834 A1 Sep. 16, 2021

(51) Int. Cl.
*B29C 64/165* (2017.01)
*B33Y 10/00* (2015.01)
*B33Y 70/00* (2020.01)

(52) U.S. Cl.
CPC ............ *B29C 64/165* (2017.08); *B33Y 10/00* (2014.12); *B33Y 70/00* (2014.12); *B29K 2995/0006* (2013.01)

(58) Field of Classification Search
CPC ..... B29C 64/165; B29C 64/153; B33Y 10/00; B33Y 70/00
See application file for complete search history.

(56) References Cited

U.S. PATENT DOCUMENTS

| 2016/0172099 A1 | 6/2016 | Panat et al. |
| 2017/0018366 A1 | 1/2017 | Gustafson |
| 2017/0221648 A1 | 8/2017 | Rolin et al. |

FOREIGN PATENT DOCUMENTS

| CN | 101146877 | 3/2008 |
| CN | 103906803 | 7/2014 |

(Continued)

OTHER PUBLICATIONS

Castles. F et al., Microwave Dielectric Characterisation of 3D-printed BaTiO3/ABS Polymer Composites, Mar. 4, 2016, https://www.nature.com/articles/srep22714.

(Continued)

*Primary Examiner* — Mary Lynn F Theisen
(74) *Attorney, Agent, or Firm* — Dierker & Kavanaugh PC

(57) ABSTRACT

In an example of a method for three-dimensional (3D) printing, a polymeric or polymeric composite build material is applied. A dielectric agent is selectively applied on at least a portion of the polymeric or polymeric composite build material. The dielectric agent includes a dielectric material having an effective relative permittivity ($\varepsilon_r$) value ranging from 1.1 to about 10,000. A fusing agent is selectively applied on the at least the portion of the polymeric or polymeric composite build material, and the polymeric or polymeric composite build material is exposed to radiation to fuse the at least the portion of the polymeric or polymeric composite build material to form a region of a layer of a 3D (Continued)

part. The region exhibits a dielectric property, a piezoelectric property, or a combination thereof.

15 Claims, 6 Drawing Sheets

(56) References Cited

FOREIGN PATENT DOCUMENTS

| | | |
|---|---|---|
| CN | 106476263 | 3/2017 |
| EP | 2654094 | 10/2013 |
| WO | WO-2015136277 A1 | 9/2015 |
| WO | WO-2016010590 A1 | 1/2016 |
| WO | WO-2016068899 A1 | 5/2016 |
| WO | WO-2017014784 | 1/2017 |
| WO | WO-2017079130 A1 | 5/2017 |
| WO | WO-2017189306 | 11/2017 |
| WO | WO-2017189306 A1 | 11/2017 |

OTHER PUBLICATIONS

Parizi, S. et al., Ferroelectric Barium Titanate Nanocubes as Capacitive Building Blocks for Energy Storage Applications, Oct. 22, 2014, https://www.ncbi.nlm.nih.gov/pubmed/25255863.

THREE-DIMENSIONAL PRINTING

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material (which, in some examples, may include build material, binder and/or other printing fluid(s), or combinations thereof). This is unlike traditional machining processes, which often rely upon the removal of material to create the final part. Some 3D printing methods use chemical binders or adhesives to bind build materials together. Other 3D printing methods involve at least partial curing, thermal merging/fusing, melting, sintering, etc. of the build material. For some materials, at least partial melting may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
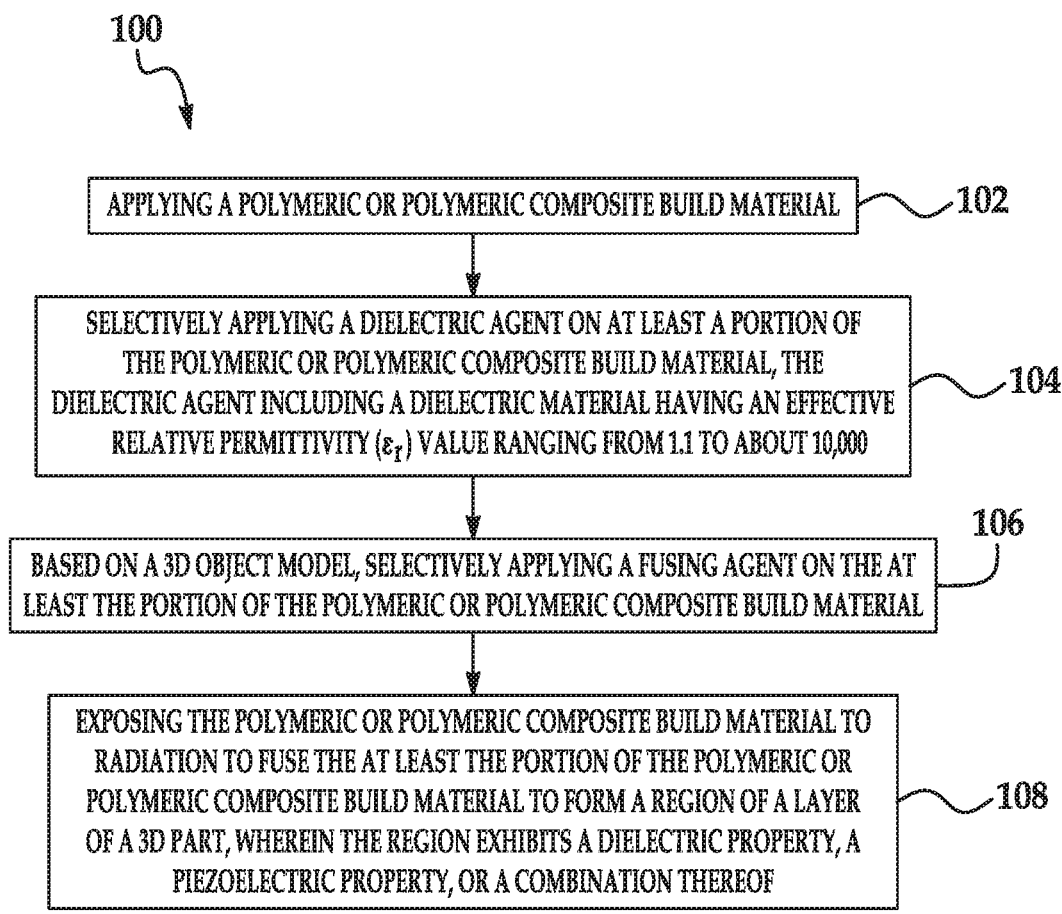
FIG. 1 is a flow diagram illustrating an example of a method for 3D printing disclosed herein.

Building and/or embedding electronics (e.g., a conductive element) on and/or within a dense part may involve assembling several different components. For example, three-dimensional printing techniques, such as extrusion or additive manufacturing, have been used to create the dense part, and then other techniques, such as electroplating or the application of conducting materials, have been used to create the electronics. Many of the materials used to create the electronics involve specific activation procedures, which may utilize specialized (e.g., proprietary, expensive, etc.) equipment, such as annealing equipment.

Examples of the three-dimensional (3D) printing method disclosed herein may utilize a dielectric agent and a fusing agent to form a layer or a region of a layer that exhibits a dielectric property and/or a piezoelectric property. In these examples, an entire layer of the polymeric or polymeric composite build material is exposed to radiation, but a patterned region (which, in some instances, is less than the entire layer) of the polymeric or polymeric composite build material is fused and hardened to become the layer of a 3D part. In the patterned region, the fusing agent is, or the fusing agent in combination with the dielectric agent are, capable of at least partially penetrating into voids between the polymeric or polymeric composite build material particles, and is/are also capable of spreading onto the exterior surface of the polymeric or polymeric composite build material particles. The fusing agent is capable of absorbing radiation and converting the absorbed radiation to thermal energy, which in turn fuses the polymeric or polymeric composite build material that is in contact with the fusing agent. Fusing causes the patterned polymeric or polymeric composite build material to join or blend to form a single entity (i.e., the layer of the 3D part) by thermal merging, melting, binding, curing, etc.

The dielectric agent is capable of imparting a dielectric property and/or a piezoelectric property to the region(s) of the layer where the dielectric agent is applied. The application of the dielectric agent is controllable using digital inkjet technology, which enables the dielectric property and/or piezoelectric property within and/or upon the surface of layer of the 3D objects/parts to be modified at the voxel level of the 3D object model (i.e., in the digital domain).

In the examples disclosed herein, the dielectric agent includes a dielectric material. The dielectric material becomes embedded in the region(s) of the 3D part to which the dielectric agent is applied and causes that/those region(s) to exhibit the dielectric property and/or the piezoelectric property. The dielectric material has an effective relative permittivity, $\varepsilon_r$, value ranging from 1.1 to about 10,000. In an example, the dielectric material has an effective $\varepsilon_r$ value ranging from about 1.1 to about 100. In another example, the dielectric material has an effective $\varepsilon_r$ value ranging from about 2 to about 80. In still another example, the dielectric material has an effective $\varepsilon_r$ value ranging from about 3 to about 10. In yet another example, the dielectric material has an effective $\varepsilon_r$ value ranging from about 1.4 to about 8. In still another example, the dielectric material has an effective $\varepsilon_r$ value ranging from about 2 to about 5. As used herein, the "effective $\varepsilon_r$ value" refers to the relative permittivity value (i.e., the ratio to absolute permittivity, 1.0) of the dielectric material when it is embedded in the 3D part.

In an example, the dielectric material is barium titanate ($BaTiO_3$) nanoparticles. Other examples of the dielectric material include lead zirconium titanate (PZT) nanoparticles, silicon dioxide ($SiO_2$) nanoparticles, silicon nitride ($Si_3N_4$) nanoparticles, aluminum oxide ($Al_2O_3$) nanoparticles, zirconium oxide ($ZrO_2$) nanoparticles, titanium oxide ($TiO_2$) nanoparticles, tantalum pentoxide ($Ta_2O_5$) nanoparticles, barium strontium titanate (BST) nanoparticles, and strontium titanate oxide (SrTiO$_3$) nanoparticles. In still another example, the dielectric material is selected from the group consisting of barium titanate nanoparticles, lead zirconium titanate nanoparticles, silicon dioxide nanoparticles, silicon nitride nanoparticles, aluminum oxide nanoparticles, zirconium oxide nanoparticles, titanium oxide nanoparticles, tantalum pentoxide nanoparticles, barium strontium titanate nanoparticles, strontium titanate oxide nanoparticles, and combinations thereof.

Examples of the dielectric material that have an effective $\varepsilon_r$ value ranging from about 1.1 to about 100, or ranging from about 2 to about 80, include barium titanate nanoparticles, lead zirconium titanate nanoparticles, silicon dioxide nanoparticles, silicon nitride nanoparticles, aluminum oxide nanoparticles, zirconium oxide nanoparticles, titanium oxide nanoparticles, tantalum pentoxide nanoparticles, barium strontium titanate nanoparticles, and strontium titanate oxide nanoparticles. Examples of the dielectric material that have an effective $\varepsilon_r$ value ranging from about 3 to about 10 include silicon dioxide nanoparticles, silicon nitride nanoparticles, and aluminum oxide nanoparticles. In some instances, the dielectric material having an effective $\varepsilon_r$ value ranging from about 3 to about 10 may also include zirconium oxide, titanium oxide, and tantalum pentoxide. Examples of the dielectric material that have an effective $\varepsilon_r$ value ranging from about 1.4 to about 8, or ranging from about 2 to about 5 include silicon dioxide nanoparticles and silicon nitride nanoparticles. In some instances, the dielectric material having an effective $\varepsilon_r$ value ranging from about 2 to about 5 may also include aluminum oxide.

In an example, the dielectric material has an average particle size ranging from about 10 nm to about 150 nm. In another example, the dielectric material has an average particle size ranging from about 10 nm to about 50 nm. In still another example, the dielectric material has an average particle size of about 50 nm. In yet another example, the dielectric material has an average particle size of about 100 nm. When the dielectric agent is to be applied using an inkjet printhead, the dielectric material may have an average particle size less than 50 nm. The particle size of the dielectric material may be selected depending, in part, upon the method to be used to apply the dielectric agent. For example, when the dielectric agent is to be inkjetted, the particle size may be 100 nm or less, or 50 nm or less. For another example, when the dielectric agent is to be applied with a pipette or other dispensing tool, the particle size may be larger, such as up to 150 nm. The term "particle size", as used herein, refers to the diameter of a spherical particle, or the average diameter of a non-spherical particle (i.e., the average of multiple diameters across the particle), or the volume-weighted mean diameter of a particle distribution.

In an example, the dielectric material is present in the dielectric agent in an amount ranging from about 2 wt % to about 50 wt %, based on the total weight of the dielectric agent. In another example, the dielectric material is present in the dielectric agent in an amount ranging from about 5 wt % to about 45 wt %, based on the total weight of the dielectric agent. In still another example, the dielectric material is present in the dielectric agent in an amount of about 22 wt %, based on the total weight of the dielectric agent. It is believed that these dielectric material loadings provide a balance between the dielectric agent having jetting reliability and efficiency in imparting the dielectric property and/or the piezoelectric property.

In addition to the dielectric material, the dielectric agent may include water, a co-solvent, and a surfactant. In some examples, the dielectric agent may also include a radiation absorber (e.g., carbon black). In other examples the dielectric agent may also include an anti-kogation agent. In an example, the dielectric agent consists of: a dielectric material having an effective $\varepsilon_r$ value ranging from 1.1 to about 10,000; water; a co-solvent; a surfactant; a radiation absorber in an amount ranging from 0 wt % to about 12 wt %, based on a total weight of the dielectric agent; and an anti-kogation agent in an amount ranging from 0 wt % to about 0.65 wt %, based on the total weight of the dielectric agent.

Water may make up the balance of the dielectric agent. As an example, deionized water may be used.

The dielectric agent may also include a co-solvent. In an example, the total amount of the co-solvent(s) present in the dielectric agent ranges from about 5 wt % to about 45 wt %, based on the total weight of the dielectric agent. In another example, the total amount of the co-solvent(s) present in the dielectric agent is about 20 wt %.

Examples of suitable co-solvents that may be included in the dielectric agent include 1,6-hexanediol or other diols (e.g., 1,5-pentanediol, 2-methyl-1,3-propanediol, etc.), dimethyl sulfoxide (DMSO), isopropyl alcohol, ethanol, pentanol, acetone, triethylene glycol, tetraethylene glycol, tripropylene glycol methyl ether, or the like, or combinations thereof. In some examples, the co-solvent may include a humectant. Examples of suitable humectants include 1-methyl-2-pyrrolidone, N-2-hydroxyethyl-2-pyrrolidone, 2-pyrrolidinone, and combinations thereof.

The co-solvent(s) of the dielectric agent may depend, in part upon the jetting technology that is to be used to dispense the dielectric agent. For example, if thermal inkjet printheads are to be used, water and/or ethanol and/or other longer chain alcohols (e.g., pentanol) may make up 35 wt % or more of the dielectric agent. For another example, if piezoelectric inkjet printheads are to be used, water may make up from about 25 wt % to about 80 wt % of the dielectric agent, and 35 wt % or more of the dielectric agent may be ethanol, isopropanol, acetone, etc.

The dielectric agent may include surfactant(s) to improve the jettability of the dielectric agent. In an example, the total amount of the surfactant(s) present in the dielectric agent ranges from about 0.04 wt % to about 6 wt %, based on the total weight of the dielectric agent. In another example, the total amount of the surfactant(s) present in the dielectric agent is about 0.4 wt %.

Examples of suitable surfactants include a self-emulsifiable, non-ionic wetting agent based on acetylenic diol chemistry (e.g., SURFYNOL® SEF from Air Products and Chemicals, Inc.), a non-ionic fluorosurfactant (e.g., CAPSTONE® fluorosurfactants, such as CAPSTONE® FS-35, from DuPont, previously known as ZONYL FSO), and combinations thereof. In other examples, the surfactant is an ethoxylated low-foam wetting agent (e.g., SURFYNOL® 465, SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6, TERGITOL™ 15-S-7, or TERGITOL™ 15-S-9 (a secondary alcohol ethoxylate) from The Dow Chemical Company). In some examples, it may be desirable to utilize a surfactant having a hydrophilic-lipophilic balance (HLB) less than 10.

In some examples, the dielectric agent may include a radiation absorber. In these examples, the radiation absorber is compatible with the dielectric agent (i.e., able to be incorporated into the dielectric agent). When the dielectric agent includes the radiation absorber, the dielectric agent may act as both the dielectric agent and the fusing agent.

The radiation absorber may be a carbon black pigment. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, and REGAL® 660R); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4).

When the carbon black pigment is used as the radiation absorber, it may be polymerically dispersed in the dielectric agent by a polymeric dispersant having a weight average molecular weight ranging from about 12,000 to about 20,000. In some of the examples disclosed herein, the carbon black pigment is initially in the form of a water-based pigment dispersion. The water-based pigment dispersion includes the carbon black pigment (which is not surface treated), the polymeric dispersant, and water (with or without a co-solvent, such as 2-pyrollidinone). The polymeric dispersant may be any styrene acrylate or any polyurethane having its weight average molecular weight ranging from about 12,000 to about 20,000. Some commercially available examples of the styrene acrylate polymeric dispersant are JONCRYL® 671 and JONCRYL® 683 (both available from BASF Corp.). Within the water-based pigment dispersion, a ratio of the carbon black pigment to the polymeric dispersant ranges from about 3.0 to about 8.0. In an example, the ratio of the carbon black pigment to the polymeric dispersant is about 3.6. In some examples, the polymeric dispersant may contribute to the carbon black pigment exhibiting enhanced radiation absorption.

In an example, the amount of the radiation absorber ranges from 0 wt % to about 12 wt %, based on a total weight of the dielectric agent. In another example, the amount of the radiation absorber that is present in the dielectric agent ranges from greater than 0 wt % to about 12 wt %, based on the total weight of the dielectric agent. In other examples, the amount of the radiation absorber in the dielectric agent ranges from greater than 0 wt % to about 6 wt %, from about 3 wt % to 6 wt %, or from greater than 4.0 wt % up to about 6 wt %. It is believed that these radiation absorber loadings provide a balance between the dielectric agent having jetting reliability and radiation absorbance efficiency. When the radiation absorber is the carbon black pigment in the form of the water-based pigment dispersion, the amount of the water-based pigment dispersion that is added to the dielectric agent may be selected so that the amount of the carbon black pigment in the dielectric agent is within the given ranges.

If it is desirable to decouple the radiation absorption from the exhibition of the dielectric property and/or the piezoelectric property, the dielectric agent may be devoid of the radiation absorber and a separate fusing agent may be used (even if the radiation absorber is compatible with the dielectric agent). Additionally, it may be desirable for the fusing agent to be separate and distinct from the dielectric agent when less than all of the fused layer is to exhibit the dielectric property and/or the piezoelectric property so that the fusing agent may be applied without applying the dielectric agent. Still further, it may be desirable for the fusing agent to be separate and distinct from the dielectric agent when it is desirable to maximize possible dielectric properties after processing. In these examples, the dielectric agent alone (i.e., without the fusing agent and without a radiation absorber in the dielectric agent) may be applied to build material 16 to create a layer or a portion thereof that will exhibit high dielectric property and minimal or no mechanical strength. In these examples then, the volume of build material 16 that receives the dielectric agent alone is supported by and/or surrounded by a mechanically stronger layer or portion thereof (i.e., a portion that is patterned with the fusing agent and fused). In these examples, the build material 16 patterned with fusing agent and fused may have enough mechanical strength to act as a supporting structure for the build material patterned with the detailing agent alone.

As used herein, the term "devoid of" when referring to a component (such as, e.g., a radiation absorber, etc.) may refer to a composition that does not include any added amount of the component, but may contain residual amounts, such as in the form of impurities. The components may be present in trace amounts, and in one aspect, in an amount of less than 0.1 weight percent (wt %) based on the total weight of the composition (e.g., dielectric agent), even though the composition is described as being "devoid of" the component. In other words, "devoid of" of a component may mean that the component is not specifically included, but may be present in trace amounts or as an impurity inherently present in certain ingredients.

In some examples, the dielectric agent may include an anti-kogation agent. The total amount of anti-kogation agent(s) in the dielectric agent may range from 0 wt % to about 0.65 wt %, based on the total weight of the dielectric agent. In an example, total amount of anti-kogation agent(s) in the dielectric agent may range greater than 0 wt % to about 0.65 wt %, based on the total weight of the dielectric agent. In another example, the total amount of anti-kogation agent(s) in the dielectric agent may range from greater than 0.20 wt % to about 0.65 wt %, based on the total weight of the dielectric agent.

The dielectric agent may include the anti-kogation agent when it is to be jetted using thermal inkjet printing. Kogation refers to the deposit of dried printing liquid (e.g., dielectric agent) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol).

The dielectric agent may additionally include any of the other components listed below as possible components of the fusing agent (e.g., antimicrobial agent(s), chelating agent(s), etc.).

In an example, the dielectric agent has a potential hydrogen (pH) value ranging from about 7 to about 9. A pH within this range is desirable, as some examples of the dielectric material may become hydrolytically unstable at pH values outside of this range. Whether the dielectric material will become hydrolytically unstable at pH values outside of this range may depend, in part, on the dielectric material used and/or the particle size of the dielectric material (which affects its ability to stay suspended in the agent).

As mentioned above, the dielectric agent may be used to impart a dielectric property and/or a piezoelectric property to region(s) of a 3D printed layer or object. It is to be understood that in the examples disclosed herein, multiple dielectric agents may also be used together. For example, a first dielectric agent may be utilized with another or a second dielectric agent. The other or second dielectric agent includes at least another or second dielectric material, which may impart a dielectric property and/or piezoelectric property that is different than the dielectric property and/or piezoelectric property imparted by the first dielectric agent. Each of the first and second dielectric agents may include any of the components in any of the amounts previously described (except that the amounts are based on the total weight for the respective agents). Utilizing multiple dielectric agents may allow for the formation of 3D parts with different dielectric properties and/or piezoelectric properties in different regions (e.g., in the x-y plane) and/or in different layers (e.g., in the z-direction). While the use of two different dielectric agents has been described, it is to be understood that any desirable number of different dielectric agents may be used in the examples disclosed herein.

Referring now to FIG. 1 and FIGS. 2A through 2E, examples of a method 100, 200 for three-dimensional (3D) printing are depicted. Prior to execution of the method 100, 200 or as part of the method 100, 200, a controller 46 (see, e.g., FIG. 4) may access data stored in a data store 48 (see, e.g., FIG. 4) pertaining to a 3D part that is to be printed. The controller 46 may determine the number of layers of polymeric or polymeric composite build material 16 that are to be formed, the locations at which the dielectric agent 26 from the applicator 24A is to be deposited on each of the respective layers, and the locations at which the fusing agent 28 from the applicator 24B is to be deposited on each of the respective layers.

As shown in FIG. 1, an example of the three-dimensional (3D) printing method 100 comprises: applying a polymeric or polymeric composite build material 16 (reference numeral 102); selectively applying a dielectric agent 26 on at least a portion 32 of the polymeric or polymeric composite build material 16, the dielectric agent 26 including a dielectric material having an effective relative permittivity ($\varepsilon_r$) value ranging from 1.1 to about 10,000 (reference numeral 104); selectively applying a fusing agent 28 on the at least the portion 32 of the polymeric or polymeric composite build material 16 (reference numeral 106); and exposing the polymeric or polymeric composite build material 16 to radiation 40 to fuse the at least the portion 32 of the polymeric or polymeric composite build material 16 to form a region 44 of a layer 42 of a 3D part, wherein the region 44 exhibits a dielectric property, a piezoelectric property, or a combination thereof (reference numeral 108).

Figure 2A:
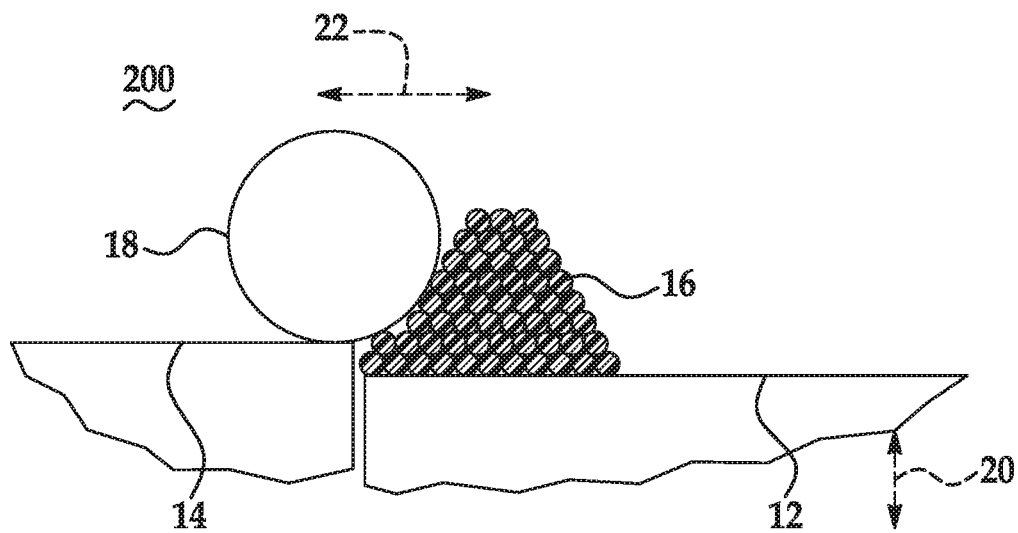
FIGS. 2A through 2E are schematic and partially cross-sectional cutaway views depicting the formation of a 3D part using an example of a method for 3D printing disclosed herein.
Figure 2B:
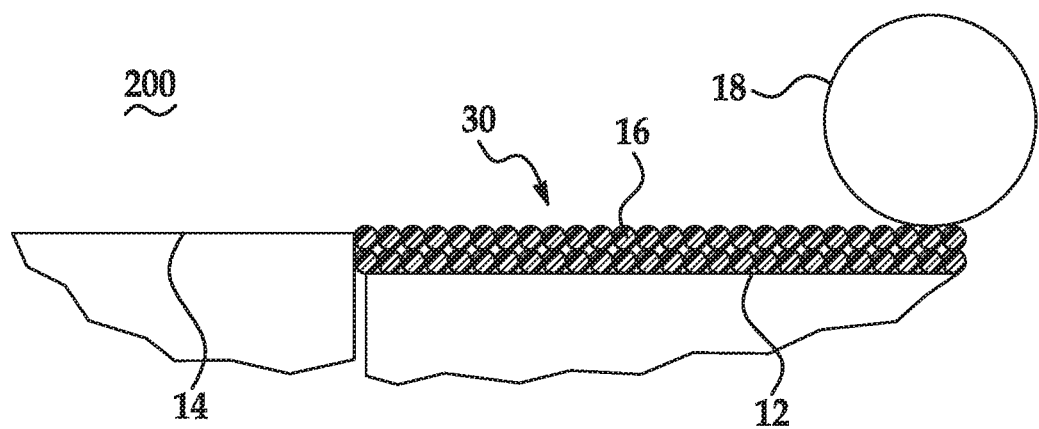

As shown at reference numeral 102 in FIG. 1 and in FIGS. 2A and 2B, the method 100, 200, includes applying the polymeric or polymeric composite build material 16. In the example shown in FIGS. 2A and 2B, a printing system (e.g., printing system 10 shown in FIG. 4) may be used to apply the polymeric or polymeric composite build material 16. The printing system 10 may include a build area platform 12, a build material supply 14 containing polymeric or polymeric composite build material particles 16, and a build material distributor 18.

The build area platform 12 receives the polymeric or polymeric composite build material 16 from the build material supply 14. The build area platform 12 may be moved in the directions as denoted by the arrow 20, e.g., along the z-axis, so that the polymeric or polymeric composite build material 16 may be delivered to the build area platform 12 or to a previously formed layer 42 (see, e.g., FIG. 2E). In an example, when the polymeric or polymeric composite build material particles 16 are to be delivered, the build area platform 12 may be programmed to advance (e.g., downward) enough so that the build material distributor 18 can push the polymeric or polymeric composite build material particles 16 onto the build area platform 12 to form a substantially uniform layer 30 of polymeric or polymeric composite build material 16 thereon. The build area platform 12 may also be returned to its original position, for example, when a new part is to be built.

The build material supply 14 may be a container, bed, or other surface that is to position the polymeric or polymeric composite build material particles 16 between the build material distributor 18 and the build area platform 12.

The build material distributor 18 may be moved in the directions as denoted by the arrow 22, e.g., along the y-axis, over the build material supply 14 and across the build area platform 12 to spread the layer 30 of the polymeric or polymeric composite build material 16 over the build area platform 12. The build material distributor 18 may also be returned to a position adjacent to the build material supply 14 following the spreading of the polymeric or polymeric composite build material particles 16. The build material distributor 18 may be a blade (e.g., a doctor blade), a roller, a combination of a roller and a blade, and/or any other device capable of spreading the polymeric or polymeric composite build material 16 over the build area platform 12. For instance, the build material distributor 18 may be a counter-rotating roller.

As shown in FIG. 2A, the build material supply 14 may supply the polymeric or polymeric composite build material particles 16 into a position so that they are ready to be spread onto the build area platform 12. The build material distributor 18 may spread the supplied polymeric or polymeric composite build material particles 16 onto the build area platform 12. The controller 46 may process control build material supply data, and in response control the build material supply 14 to appropriately position the polymeric or polymeric composite build material particles 16, and may process control spreader data, and in response, control the build material distributor 18 to spread the supplied polymeric or polymeric composite build material particles 16 over the build area platform 12 to form the layer 30 of polymeric or polymeric composite build material 16 thereon. As shown in FIG. 2B, one build material layer 30 has been formed.

The layer 30 of polymeric or polymeric composite build material 16 has a substantially uniform thickness across the build area platform 12. In an example, the thickness of the build material layer 30 is about 100 µm. In another example, the thickness of the build material layer 30 ranges from about 30 µm to about 300 µm, although thinner or thicker layers may also be used. For example, the thickness of the build material layer 30 may range from about 20 µm to about 500 µm, or from about 50 µm to about 80 µm. The layer thickness may be about 2× (i.e., 2 times) the particle diameter (as shown in FIG. 2B) at a minimum for finer part definition. In some examples, the layer thickness may be about 1.5× the particle diameter.

After the polymeric or polymeric composite build material 16 has been applied, and prior to further processing, the build material layer 30 may be exposed to heating. Heating may be performed to pre-heat the polymeric or polymeric composite build material particles 16, and thus the heating temperature may be below the melting point or softening point of the polymeric or polymeric composite build material particles 16. As such, the temperature selected will depend upon the polymeric or polymeric composite build material particles 16 that are used. As examples, the pre-heating temperature may be from about 5° C. to about 50° C. below the melting point or softening point of the polymeric or polymeric composite build material particles 16. In an example, the pre-heating temperature ranges from about 50° C. to about 250° C. In another example, the pre-heating temperature ranges from about 150° C. to about 170° C.

Pre-heating the layer 30 of the polymeric or polymeric composite build material particles 16 may be accomplished using any suitable heat source that exposes all of the polymeric or polymeric composite build material particles 16 on the build area platform 12 to the heat. Examples of the heat source include a thermal heat source (e.g., a heater (not shown) integrated into the build area platform 12 (which may include sidewalls)) or the radiation source 36, 36'.

Figure 2C:
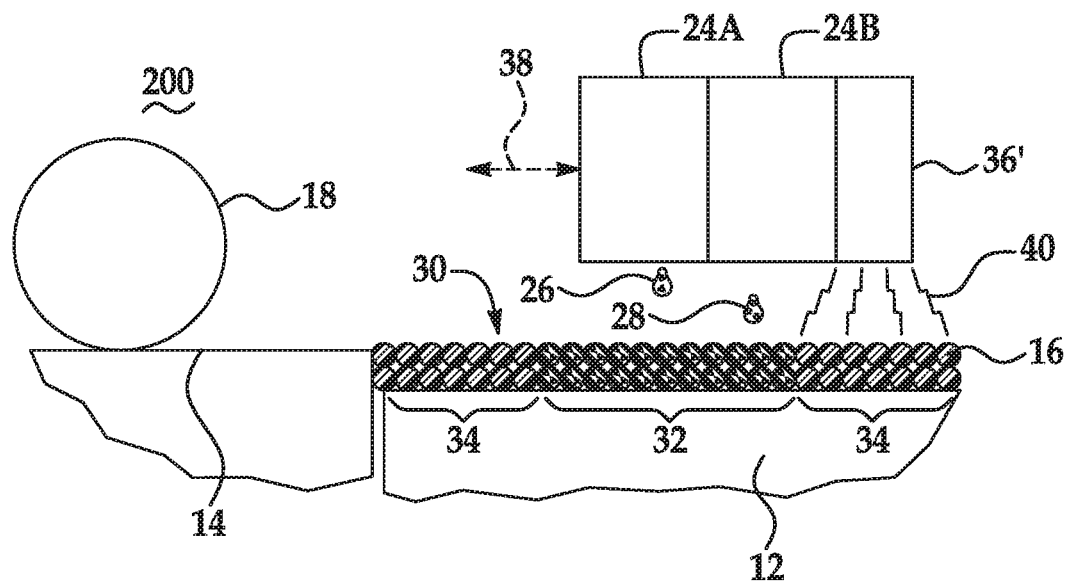

As shown at reference numeral 104 in FIG. 1 and in FIG. 2C, the method 100, 200 continues by selectively applying the dielectric agent 26 on at least a portion 32 of the polymeric or polymeric composite build material 16. As mentioned above, the dielectric agent 26 includes the dielectric material.

As shown at reference numeral 106 in FIG. 1 and in FIG. 2C, the method 100, 200 also includes selectively applying the fusing agent 28 on the at least the portion 32 of the polymeric or polymeric composite build material 16. The fusing agent 28 includes a radiation absorber. The composition of the fusing agent 28 will be described in more detail below.

As illustrated in FIG. 2C, the dielectric agent 26 may be dispensed from the first applicator 24A, and the fusing agent 28 may be dispensed from the second applicator 24B. In an example, the dielectric agent 26 may be dispensed onto the portion 32 first, and then the fusing agent 28 may be dispensed onto the portion 32. In another example, the fusing agent 28 may be dispensed onto the portion 32 first, and then the dielectric agent 26 may be dispensed onto the portion 32. It may be desirable to dispense the fusing agent 28 first, and then the dielectric agent 26 when the amount of the dielectric material dispensed (through the application of the dielectric agent 26) is smaller (e.g., the dielectric material dispensed ranges from about 1% to about 60% of the full loading that is applied, i.e., the sum of the loading of the fusing agent 28 and the loading of the dielectric agent 26). In these examples, dispensing the fusing agent 28 first, and then the dielectric agent 26 may reduce the formation of dielectric material agglomerates in the layer (as compared the formation of dielectric material agglomerates in a layer to which the dielectric agent 26 is applied first, and then the fusing agent 28 is applied). In still another example, the dielectric agent 26 and the fusing agent 28 may be dispensed at least substantially simultaneously (e.g., one immediately after the other in a single printing pass, or at the same time).

As mentioned above, when the dielectric agent 26 includes the radiation absorber, the dielectric agent 26 may act as both the dielectric agent 26 and the fusing agent 28. As such, in these examples, a separate fusing agent 28 may not be used, and the selective application of the dielectric agent 26 and the selective application of the fusing agent 28 are accomplished simultaneously by applying the dielectric agent 26 including the radiation absorber. As such, in these examples, one applicator 24A or 24B may be used.

The applicators 24A and/or 24B may each be a thermal inkjet printhead, a piezoelectric printhead, etc., and each of the selectively applying of the dielectric agent 26 and the selectively applying of the fusing agent 28 may be accomplished by thermal inkjet printing, piezo electric inkjet printing, etc.

The controller 46 may process data, and in response, control the first applicator 24A (e.g., in the directions indicated by the arrow 38) to deposit the dielectric agent 26 onto predetermined portion(s) 32 of the polymeric or polymeric composite build material 16 that are to form the region 44 (that exhibits the dielectric property and/or the piezoelectric property) of the layer 42. The region 44 of the layer 42 has the dielectric material of the dielectric agent 26 embedded therein. The first applicator 24A may be programmed to receive commands from the controller 46 and to deposit the dielectric agent 26 according to a pattern of a cross-section for the region 44 (of the layer of the 3D part that is to be formed) that is to exhibit the dielectric property and/or the piezoelectric property. In the example shown in FIG. 2C, the first applicator 24A selectively applies the dielectric agent 26 on those portion(s) 32 of the layer 30 that is/are to exhibit the dielectric property and/or the piezoelectric property in the first layer of the 3D part. In the example shown in FIG. 2C, the dielectric agent 26 is deposited on the portion 32 of the layer 30 and not on the portions 34.

When the dielectric agent 26 is selectively applied in the desired area(s), the dielectric material (present in the dielectric agent 26) infiltrates the inter-particles spaces among the polymeric or polymeric composite build material 16. The volume of the dielectric agent 26 that is applied per unit of the polymeric or polymeric composite build material 16 in the patterned portion 32 may be sufficient to achieve a region 44 that exhibits the desired dielectric property and/or the desired piezoelectric property. The volume of the dielectric agent 26 that is applied per unit of the polymeric or polymeric composite build material 16 may depend, at least in part, on the dielectric material, the dielectric material loading in the dielectric agent 26, and the polymeric or polymeric composite build material 16 used. In one example, the loading may be selected so that the desired dielectric and/or piezoelectric property is obtained, but so that the dielectric material does not form large agglomerates that can impede the mechanical strength of the 3D object/part. In an example, dielectric material agglomerates greater than 10% of the layer thickness may impede the mechanical strength of the 3D object/part. When dielectric material agglomerates are 10% or less of the layer thickness, fused bonds between adjacent polymer particles may be sufficient to achieve a desired mechanical strength. As an example, for a 34 µm thick layer, a 3.4 µm maximum diameter agglomerate would generally allow for some mechanical strength, as some fused bonds between adjacent polymer particles would allow for mechanical bonding throughout the layer. In this same example, larger dielectric material agglomerates, e.g., on the order of 10 µm to 20 µm, may reduce the mechanical strength of the 34 µm layer. In another example, when the dielectric material (through the application of the dielectric agent 26 without the radiation absorber) is applied at 10 vol % or less, the mechanical strength of the 3D object/part may be at least substantially unimpeded. In still another example, when the dielectric material is 50 vol % or more, the mechanical strength of the 3D object/part may be significantly impeded, in part because there is less volume for the fusing agent.

The controller 46 may also process data, and in response, control the second applicator 24B (e.g., in the directions indicated by the arrow 38) to deposit the fusing agent 28 onto predetermined portion(s) 32 of the polymeric or polymeric composite build material 16 that are to become part of the 3D part. The second applicator 24B may be programmed to receive commands from the controller 46 and to deposit the fusing agent 28 according to a pattern of a cross-section for the layer 42 of the 3D part that is to be formed. As used herein, the cross-section of the layer 42 of the 3D part to be formed refers to the cross-section that is parallel to the surface of the build area platform 12. In the example shown in FIG. 2C, the second applicator 24B selectively applies the fusing agent 28 on those portion(s) 32 of the layer 30 that is/are to become the first layer of the 3D part. As an example, if the 3D part that is to be formed is to be shaped like a cube or cylinder, the fusing agent 28 will be deposited in a square pattern or a circular pattern (from a top view), respectively, on at least a portion of the layer 30 of the polymeric or polymeric composite build material particles 16. In the example shown in FIG. 2C, the fusing agent 28 is deposited on the portion 32 of the layer 30 and not on the portions 34.

As mentioned above, the fusing agent 28 includes the radiation absorber. The volume of the fusing agent 28 that is applied per unit of the polymeric or polymeric composite build material 16 in the patterned portion 32 may be sufficient to absorb and convert enough radiation 40 so that the polymeric or polymeric composite build material 16 in the patterned portion 32 will fuse. The volume of the fusing agent 28 that is applied per unit of the polymeric or polymeric composite build material 16 may depend, at least in part, on the radiation absorber used, the radiation absorber loading in the fusing agent 28, and the polymeric or polymeric composite build material 16 used.

In some examples, such as the example shown in FIG. 2C, the dielectric agent 26 and the fusing agent 28 are applied in the same portion(s) (e.g., portion 32). In these examples, the region 44 containing the dielectric material, and thus exhibiting the dielectric property and/or the piezoelectric property, is the entire layer 42 of the 3D part.

While the portion 32 of the layer 30 is shown having both the dielectric agent 26 and the fusing agent 28 applied thereto, it is to be understood that in some examples of the method 100, 200, some area(s) of the layer 30 may have the fusing agent 28 applied thereto, but may not have the dielectric agent 26 applied thereto. These area(s) of the layer 30 will become part of the 3D part that is formed, but will not exhibit the dielectric property and/or the piezoelectric property. As such, these area(s) do not become part of the region 44 of the 3D part that has the dielectric material embedded therein and exhibits the dielectric property and/or the piezoelectric property. Rather, these area(s) make up a remaining region of the 3D part that does not exhibit the dielectric property or the piezoelectric property.

As such, in some examples of the method 100, 200, the at least the portion 32 (with the dielectric and fusing agents applied thereto) of the polymeric or polymeric composite build material 16 is less than all of the polymeric or polymeric composite build material 16; the method 100, 200 further comprises selectively applying the fusing agent 28 on another portion of the polymeric or polymeric composite build material 16; the exposing of the polymeric or polymeric composite build material 16 to radiation 40 fuses the other portion of the polymeric or polymeric composite build material 16 and forms a remaining region of the layer 42 of the 3D part. In some of these examples, the remaining region of the layer 42 does not exhibit the dielectric property or the piezoelectric property.

In these other examples, the method 100, 200 includes applying the fusing agent 28 on a portion of the polymeric or polymeric build material 16 to which the dielectric agent 26 is not applied. For example, the dielectric agent 26 may be applied to a portion of the polymeric or polymeric build material 16 (and thus the portion is less than all of the polymeric or polymeric build material 16), and the fusing agent 28 may be selectively applied on the portion and on another portion of the polymeric or polymeric build material 16. As such, the exposing of the polymeric or polymeric composite build material 16 to radiation 40 fuses the portion and the other portion of the polymeric or polymeric composite build material 16 and forms a layer 42, which includes a remaining region. In these examples, a region (i.e., the remaining region) that does not exhibit the dielectric property or the piezoelectric property is formed. The region without the dielectric material embedded therein may be an entire layer of the 3D part or may be a remaining region of a layer that also includes a region 44 (i.e., part of a layer exhibits the dielectric property and/or the piezoelectric property and another part of the layer does not). When the region that does not exhibit the dielectric property and/or the piezoelectric property is the remaining region of a layer 42 that also exhibits the dielectric property and/or the piezoelectric property, the portion of the polymeric or polymeric composite build material 16 to which the dielectric agent 26 is applied is less than all of the polymeric or polymeric composite build material 16.

In some examples of the method 100, 200, when the region 44 is to be less than all of the fused layer 42, the selectively applying of the fusing agent 28 includes applying a greater amount of the fusing agent 28 to the region on which the dielectric agent 26 is applied than to the remaining region on which the dielectric agent 26 is not applied. It may be desirable to apply a greater amount of the fusing agent 28 to the region than to the remaining region to compensate for a cooling effect that the dielectric agent 26 may have on the region on which it is applied. For example, the evaporation of the water and/or co-solvent(s) of the dielectric agent 26 may decrease the temperature of the polymeric or polymeric composite build material 16. The greater amount of the fusing agent 28 applied to the region may absorb more radiation 40 and convert that additional radiation 40 to thermal heat. Thus, the greater amount of the fusing agent 28 may partially or completely compensate for a decrease in temperature due to the dielectric agent 26.

In some other examples of the method 100, 200, when the region 44 is to be less than all of the fused layer 42, the selectively applying of the fusing agent 28 includes selectively applying an at least substantially similar amount of the fusing agent 28 to the region (on which the dielectric agent 26 is applied) and to the remaining region (on which the dielectric agent 26 is not applied) at different times, or at a different time than when the dielectric agent 26 is selectively applied. In an example, the same amount of fusing agent 28 may be applied to the region and the remaining region, and timing of the fusing agent 28 application and the dielectric agent 26 application may be separated. It may be desirable to apply the fusing agent 28 and the dielectric agent 26 at different times to compensate for thermal differences at the region and the remaining region, which may result from a cooling effect that the dielectric agent 26 may have on the region on which it is applied. As mentioned above, the evaporation of the water and/or co-solvent(s) of the dielectric agent 26 may decrease the temperature of the polymeric or polymeric composite build material 16. Applying the fusing agent 28 at different times between the region and the remaining region gives more time for solvent evaporation and thus, may allow the both the region and the remaining region to be at the same temperature(s) with the same amount of fusing agent 28 applied.

In still other examples of the method 100, 200, it may not be desirable to compensate or to fully compensate for the cooling effect of the dielectric agent 26. In these examples, the same amount of fusing agent 28 may be applied on the entire portion at the same time and the entire layer 42 will fuse. Alternatively, in these examples, the cooling effect may be partially compensated for by applying a greater amount of the fusing agent 28 to the region than to the remaining region (but not enough to reach the same temperature as the remaining region) or by giving more time for solvent evaporation (but not enough to reach the same temperature as the remaining region).

In yet other examples of the method 100, 200, the region 44 is all of the layer 42. In these examples, the cooling effect of the dielectric agent 26 does not cause a thermal gradient. In these examples, the dielectric agent 26 is applied on all of the portion 32 to which the fusing agent 28 is applied. Thus, the entire portion 32 may be at the same temperature(s) when the same amount of fusing agent 28 is applied at the same time. In these examples, the same amount of fusing agent 28 may be applied at the same time on the entire portion 32.

While not shown, in some examples, the method 100, 200 may further include selectively applying the other or second dielectric agent including the other or second dielectric material on a portion of the polymeric or polymeric composite build material 16. In this example, the fused layer 42 exhibits another or second dielectric property and/or another or second piezoelectric property.

The other or second dielectric agent may be applied to the same portion(s) (e.g., portion 32) as, or to different portion(s) than, the portion(s) (e.g., portion 32) to which dielectric agent 26 is applied. For example, if the agents impart different dielectric and/or piezoelectric properties that together result in a region (e.g., region 44) exhibiting a desired dielectric property and/or desired piezoelectric property (formed from the combination of the different dielectric materials in the agents), it may be desirable to apply the agents in the same area(s) or portion(s) 32. For another example, if the 3D part is to exhibit different dielectric and/or piezoelectric properties in different regions, it may be desirable to apply the agents in different area(s) or portion(s) 32.

The other or second dielectric agent may be applied to the polymeric or polymeric composite build material 16 with one of the applicators 24A, 24B (from a separate cartridge for dispensing the other or second dielectric agent) or with a third applicator (not shown) that may be similar to the applicators 24A, 24B.

It is to be understood that a single fusing agent 28 may be selectively applied on the portion 32, or multiple fusing agents 28 may be selectively applied on the portion 32. When multiple fusing agents 28 are utilized, each is capable of absorbing enough radiation 40 so that the polymeric or polymeric composite build material 16 in the patterned portion 32 will fuse. As an example, multiple fusing agents 28 may be used when the dielectric agent 26 includes a radiation absorber (and thus, acts as one fusing agent 28), and another fusing agent 28 is applied on another portion of the build material 16 to which the dielectric agent 26 is not applied.

It is also to be understood that the selectively applying of the dielectric agent 26 and/or the selectively applying of the fusing agent 28 may be accomplished in a single printing pass or in multiple printing passes. For example, the selectively applying of the dielectric agent 26 and/or the selectively applying of the fusing agent 28 may be accomplished in 4 printing passes. It may be desirable to apply the dielectric agent 26 and/or the fusing agent 28 in multiple printing passes to increase the amount of the dielectric material and/or the amount of the radiation absorber that is/are applied to the layer 30, to avoid liquid splashing and/or displacement of build material 16, etc.

Figure 2D:
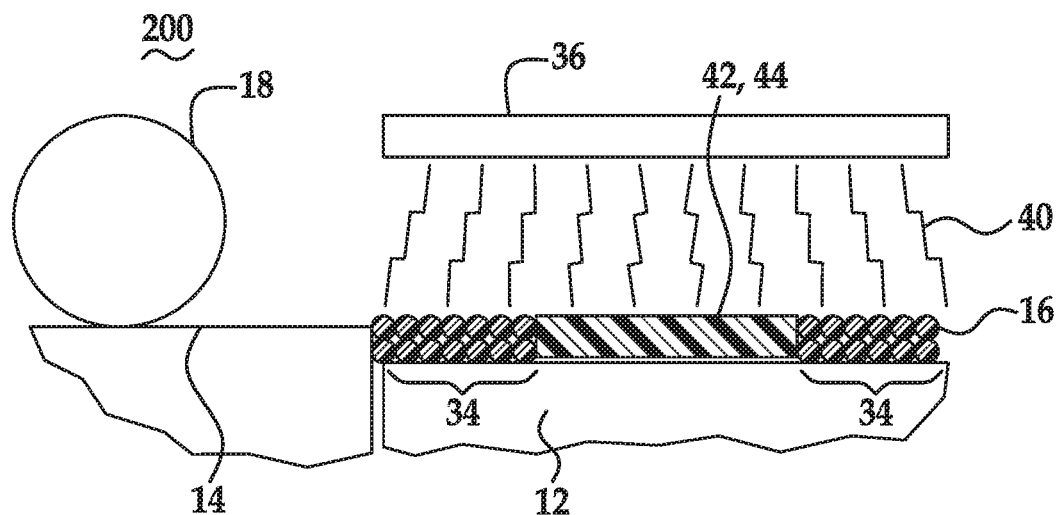

As shown at reference numeral 108 in FIG. 1 and FIGS. 2C and 2D, the method 100, 200 continues by exposing the polymeric or polymeric composite build material 16 to radiation 40 to fuse the at least the portion 32 of the polymeric or polymeric composite build material 16 to form a region 44 of a layer 42, wherein the region 44 of the layer 42 exhibits a dielectric property, a piezoelectric property, or a combination thereof. The radiation 46 may be applied with the source 36 of radiation 40 as shown in FIG. 2D or with the source 36' of radiation 40 as shown in FIG. 2C.

It is to be understood that the exposing of the polymeric or polymeric composite build material 16 to radiation 40 may be accomplished in a single radiation event or in multiple radiation events. For example, the exposing of the polymeric or polymeric composite build material 16 to radiation 40 may be accomplished in 8 radiation events. It may be desirable to expose of the polymeric or polymeric composite build material 16 to radiation 40 in multiple radiation events to counteract a cooling effect that may be brought on by the large amount of the dielectric agent 26 and/or the fusing agent 28 that is applied to the layer 30.

The fusing agent 28 enhances the absorption of the radiation 40, converts the absorbed radiation 40 to thermal energy, and promotes the transfer of the thermal heat to the polymeric or polymeric composite build material particles 16 in contact therewith. In an example, the fusing agent 28 sufficiently elevates the temperature of the polymeric or polymeric composite build material particles 16 in layer 30 above the melting or softening point of the particles 16, allowing fusing (e.g., melting, binding, etc.) of the polymeric or polymeric composite build material particles 16 to take place. The application of the radiation 40 forms the fused layer 42, as shown in FIG. 2D.

It is to be understood that portions 34 of the polymeric or polymeric composite build material 16 that do not have the fusing agent 28 applied thereto do not absorb enough radiation 40 to fuse. As such, these portions 34 do not become part of the 3D part that is ultimately formed. The polymeric or polymeric composite build material 16 in portions 34 may be reclaimed to be reused as build material in the printing of another 3D part.

The dielectric material (from the dielectric agent 26) becomes embedded in the region 44 of the fused layer 42 and imparts the dielectric property and/or the piezoelectric property to the region 44. In some examples, the dielectric material may form a matrix and/or agglomerates within the region 44. In these examples, the matrix and/or agglomerates may contribute to the region 44 exhibiting the dielectric property and/or the piezoelectric property.

In an example of the method 100, 200, the region 44 exhibits the dielectric property, the piezoelectric property, or the combination at a frequency ranging from greater than 0

Hz to about 80 GHz. In another example, the region 44 exhibits the dielectric property and/or the piezoelectric property at a frequency ranging from about 10 Hz to about 8 GHz. In still another example, the region 44 exhibits the dielectric property and/or the piezoelectric property at a frequency ranging from about 10 Hz to about 200 MHz. In yet another example, the region 44 exhibits the dielectric property and/or the piezoelectric property at a frequency ranging from about 100 Hz to about 1000 Hz.

In an example of the method 100, 200, the region 44 of the layer 42 exhibits a relative permittivity ($\varepsilon_r$) value ranging from about 10 to about 50. In other examples, the region 44 of the layer 42 exhibits a relative permittivity ($\varepsilon_r$) value equal to the effective $\varepsilon_r$ value of the dielectric material used.

It is to be understood that portions 34 of the polymeric or polymeric composite build material 16 that do not have the dielectric agent 26 applied thereto do not have the dielectric material embedded therein. As such, these portions 34 do not exhibit the dielectric property and/or the piezoelectric property.

Figure 2E:
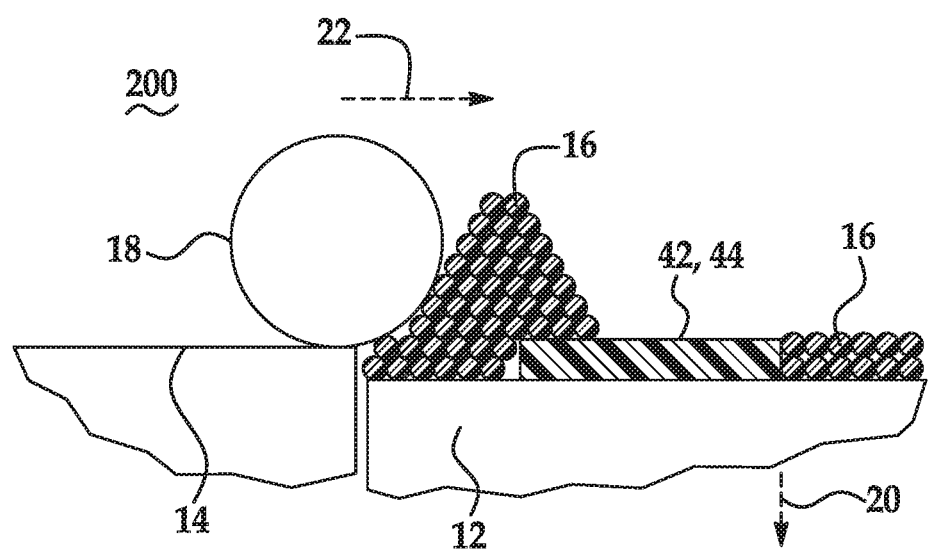

The processes shown in FIG. 1 and FIGS. 2A through 2D may be repeated to iteratively build up several fused layers and to form the 3D printed part. FIG. 2E illustrates the initial formation of a second layer of polymeric or polymeric composite build material particles 16 on the previously formed layer 42. In FIG. 2E, following the fusing of the predetermined portion(s) 32 of the layer 30 of polymeric or polymeric composite build material 16, the controller 46 may process data, and in response cause the build area platform 12 to be moved a relatively small distance in the direction denoted by the arrow 20. In other words, the build area platform 12 may be lowered to enable the next layer of polymeric or polymeric composite build material particles 16 to be formed. For example, the build material platform 12 may be lowered a distance that is equivalent to the height of the layer 30. In addition, following the lowering of the build area platform 12, the controller 46 may control the build material supply 14 to supply additional polymeric or polymeric composite build material particles 16 (e.g., through operation of an elevator, an auger, or the like) and the build material distributor 18 to form another layer of polymeric or polymeric composite build material particles 16 on top of the previously formed layer 42 with the additional polymeric or polymeric composite build material 16. The newly formed layer may be, in some instances, pre-heated, patterned with the dielectric agent 26, patterned with the fusing agent 28, and then exposed to radiation 40 from the source 36, 36' of radiation 40 to form the additional fused layer.

Figure 3:
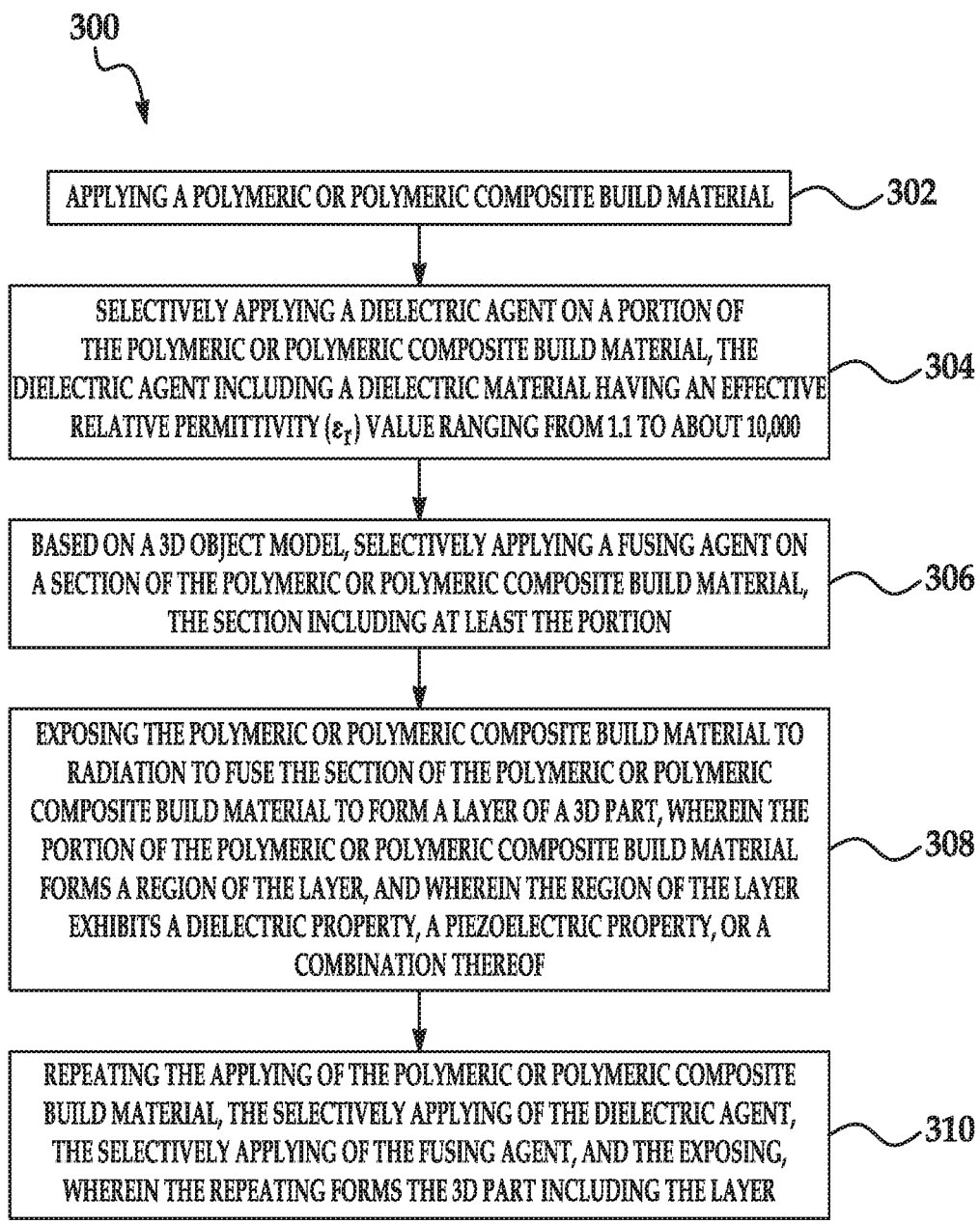
FIG. 3 is a flow diagram illustrating another example of a method for 3D printing disclosed herein.

Referring now to FIG. 3, another example of a three-dimensional (3D) printing method 300 is depicted. As shown in FIG. 3, one example of the three-dimensional (3D) printing method 300, comprises: applying a polymeric or polymeric composite build material 16 (reference numeral 302); selectively applying a dielectric agent 26 on a portion 32 of the polymeric or polymeric composite build material 16, the dielectric agent 26 including a dielectric material having an effective relative permittivity ($\varepsilon_r$) value ranging from 1.1 to about 10,000 (reference numeral 304); selectively applying a fusing agent 28 on a section of the polymeric or polymeric composite build material 16, the section including at least the portion 32 (reference numeral 306); exposing the polymeric or polymeric composite build material 16 to radiation 40 to fuse the section of the polymeric or polymeric composite build material 16 to form a layer 42 of a 3D part, wherein the portion 32 of the polymeric or polymeric composite build material 16 forms a region 44 of the layer 42, and wherein the region 44 of the layer 42 exhibits a dielectric property, a piezoelectric property, or a combination thereof (reference numeral 308); and repeating the applying of the polymeric or polymeric composite build material 16, the selectively applying of the dielectric agent 26, the selectively applying of the fusing agent 28, and the exposing, wherein the repeating forms the 3D part including the layer 42 (reference numeral 310).

In some examples, the method 100, 200, 300 may be used to form a high dielectric, low frequency capacitor. These capacitors may be particularly suitable for energy storage applications. In one of these examples, the high dielectric, low frequency capacitor has a dielectric constant ranging from about 10 to about 50, at frequencies ranging from about 100 Hz to about 10,000 Hz. In other examples, the method 100, 200, 300 may be used to form other parts that exhibit a dielectric property and/or a piezoelectric property. In some of these other examples, the method 100, 200, 300 may be used to form a piezoelectric transducer, a sensor (e.g., a microphone, a strain sensing device, etc.), or a drive or output device (e.g., an ultrasound beam generator, a speaker, fine positioning device, etc.). An example sensor is a capacitor structure formed with the barium titanate dielectric material. In this example, force applied to the capacitor structure will cause dimensional change to the structure. When this dimensional change is along the axis of the electric field in the capacitor, a change in capacitance of the structure will occur. Electronic circuits can then be used to detect this capacitance change, and hence the movement that caused it. When a drive or output device is formed using the method 100, 200, 300, a variable voltage applied to the capacitor structure may cause a mechanical movement. Thus, the voltage applied to the capacitor structure is translated into mechanical movement.

Figure 4:
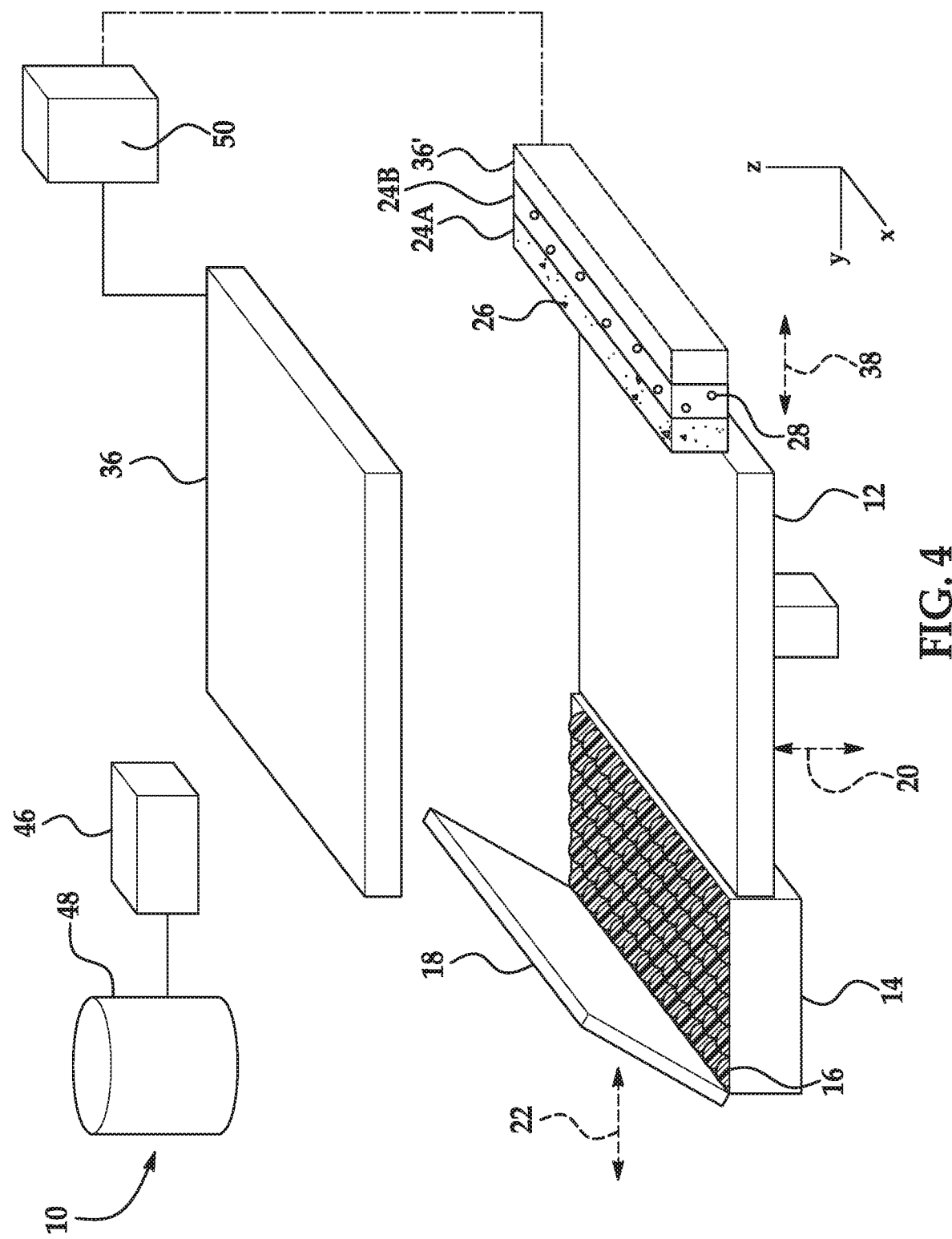
FIG. 4 is a simplified isometric and schematic view of an example of a 3D printing system disclosed herein.

Referring now to FIG. 4, an example of a 3D printing system 10 is schematically depicted. It is to be understood that the 3D printing system 10 may include additional components (some of which are described herein) and that some of the components described herein may be removed and/or modified. Furthermore, components of the 3D printing system 10 depicted in FIG. 4 may not be drawn to scale and thus, the 3D printing system 10 may have a different size and/or configuration other than as shown therein.

In an example, the three-dimensional (3D) printing system 10 comprises: a supply 14 of the polymeric or polymeric composite build material 16; the build material distributor 18; a supply of the dielectric agent 26 including a dielectric material having an effective permittivity value ($\varepsilon_r$) value ranging from 1.1 to about 10,000; a first applicator 24A for selectively dispensing the dielectric agent 26; a supply of the fusing agent 28; the second applicator 24B for selectively dispensing the fusing agent 28; a source 36, 36' of radiation 40; a controller 46; and a non-transitory computer readable medium having stored thereon computer executable instructions to cause the controller 46 to: utilize the build material distributor 18 to dispense the polymeric or polymeric composite build material 16; utilize the first applicator 24A and the second applicator 24B to respectively and selectively dispense the dielectric agent 26 and the fusing agent 28 on at least a portion 32 of the polymeric or polymeric composite build material 16; and utilize the source 36, 36' of radiation 40 to expose the polymeric or polymeric composite build material 16 to radiation 40 to fuse the at least the portion 32 of the polymeric or polymeric composite build material 16 to form a region 44 of a layer 42, wherein the region 44 of the layer 42 exhibits a dielectric property, a piezoelectric property, or a combination thereof.

As shown in FIG. 4, the printing system 10 includes the build area platform 12, the build material supply 14 containing the polymeric or polymeric composite build material 16, and the build material distributor 18.

As mentioned above, the build area platform 12 receives the polymeric or polymeric composite build material 16 from the build material supply 14. The build area platform 12 may be integrated with the printing system 10 or may be a component that is separately insertable into the printing system 10. For example, the build area platform 12 may be a module that is available separately from the printing system 10. The build material platform 12 that is shown is one example, and could be replaced with another support member, such as a platen, a fabrication/print bed, a glass plate, or another build surface.

As also mentioned above, the build material supply 14 may be a container, bed, or other surface that is to position the polymeric or polymeric composite build material 16 between the build material distributor 18 and the build area platform 12. In some examples, the build material supply 14 may include a surface upon which the polymeric or polymeric composite build material 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to provide, e.g., move, the polymeric or polymeric composite build material 16 from a storage location to a position to be spread onto the build area platform 12 or onto a previously formed layer 42 of the 3D part.

As also mentioned above, the build material distributor 18 may be a blade (e.g., a doctor blade), a roller, a combination of a roller and a blade, and/or any other device capable of spreading the polymeric or polymeric composite build material 16 over the build area platform 12 (e.g., a counter-rotating roller).

As shown in FIG. 4, the printing system 10 also includes the first applicator 24A, which may contain the dielectric agent 26 and the second applicator 24B, which may include the fusing agent 28. Although shown as separate applicators 24A, 24B, it is to be understood that a single applicator with individual cartridges for dispensing the respective fluids 26, 28 may be used. Additionally, when the dielectric agent 26 includes the radiation absorber and acts as both the dielectric agent 26 and the fusing agent 28, one applicator 24A or 24B may be used.

As mentioned above, the printing system 10 may also include a third applicator (not shown), which may contain the other or second dielectric agent, and may be similar to the first and second applicator(s) 24A, 24B.

The applicator(s) 24A, 24B may be scanned across the build area platform 12 in the direction indicated by the arrow 38, e.g., along the y-axis. The applicator(s) 24A, 24B may be, for instance, a thermal inkjet printhead, a piezoelectric printhead, a continuous inkjet printhead, etc., and may extend a width of the build area platform 12. While each of the applicator(s) 24A, 24B is shown in FIG. 4 as a single applicator, it is to be understood that each of the applicator(s) 24A, 24B may include multiple applicators that span the width of the build area platform 12. Additionally, the applicator(s) 24A, 24B may be positioned in multiple printbars. The applicator(s) 24A, 24B may also be scanned along the x-axis, for instance, in configurations in which the applicator(s) 24A, 24B does/do not span the width of the build area platform 12 to enable the applicator(s) 24A, 24B to respectively deposit the dielectric agent 26 and the fusing agent 28 over a large area of a layer 30 of polymeric or polymeric composite build material particles 16. The applicator(s) 24A, 24B may thus be attached to a moving XY stage or a translational carriage (neither of which is shown) that moves the applicator(s) 24A, 24B adjacent to the build area platform 12 in order to deposit the dielectric agent 26 and the fusing agent 28 (respectively) in predetermined areas 32 of a layer 30 of the polymeric or polymeric composite build material particles 16 that has been formed on the build area platform 12 in accordance with the method(s) 100, 200, 300 disclosed herein. The applicator(s) 24A, 24B may include a plurality of nozzles (not shown) through which the dielectric agent 26 and the fusing agent 28 (respectively) are to be ejected.

The applicators 24A, 24B may respectively deliver drops of the dielectric agent 26 and the fusing agent 28 at a resolution ranging from about 300 dots per inch (DPI) to about 1200 DPI. In other examples, the applicator(s) 24A, 24B may deliver drops of the respective fluids 26, 28 at a higher or lower resolution. The drop velocity may range from about 5 m/s to about 24 m/s and the firing frequency may range from about 1 kHz to about 100 kHz. In one example, each drop may be on the order of about 3 picoliters (pl) to about 18 pl, although it is contemplated that a higher or lower drop volume may be used. In some examples, the applicators 24A, 24B are able to deliver variable size drops of the fluids 26, 28, respectively. One example of a suitable printhead has 600 DPI resolution and can deliver drop volumes ranging from about 6 pl to about 14 pl.

Each of the previously described physical elements may be operatively connected to a controller 46 of the printing system 10. The controller 46 may process print data that is based on a 3D object model of the 3D object/part to be generated. In response to data processing, the controller 46 may control the operations of the build area platform 12, the build material supply 14, the build material distributor 18, and the applicator(s) 24A, 24B. As an example, the controller 46 may control actuators (not shown) to control various operations of the 3D printing system 10 components. The controller 46 may be a computing device, a semiconductor-based microprocessor, a central processing unit (CPU), an application specific integrated circuit (ASIC), and/or another hardware device. Although not shown, the controller 46 may be connected to the 3D printing system 10 components via communication lines.

The controller 46 manipulates and transforms data, which may be represented as physical (electronic) quantities within the printer's registers and memories, in order to control the physical elements to create the 3D part. As such, the controller 46 is depicted as being in communication with a data store 48. The data store 48 may include data pertaining to a 3D part to be printed by the 3D printing system 10. The data for the selective delivery of the polymeric or polymeric composite build material particles 16, the dielectric agent 26, the fusing agent 28, etc. may be derived from a model of the 3D part to be formed. For instance, the data may include the locations on each layer of polymeric or polymeric composite build material particles 16 that the first applicator 24A is to deposit the dielectric agent 26 and the locations that the second applicator 24B is to deposit the fusing agent 28. In one example, the controller 46 may use the data to control the first applicator 24A to selectively apply the dielectric agent 26. In another example, the controller 46 may use the data to control the second applicator 24B to selectively apply the fusing agent 28. The data store 34 may also include machine readable instructions (stored on a non-transitory computer readable medium) that are to cause the controller 46 to control the amount of polymeric or polymeric composite build material particles 16 that is supplied by the build material supply 14, the movement of the build area platform 12, the movement of the build material distributor 18, the movement of the applicator(s) 24A, 24B, etc.

As shown in FIG. 4, the printing system 10 may also include a source 36, 36' of radiation 40. In some examples, the source 36 of radiation 40 may be in a fixed position with respect to the build material platform 12. The source 36 in the fixed position may be a conductive heater or a radiative heater that is part of the printing system 10. These types of heaters may be placed below the build area platform 12 (e.g., conductive heating from below the platform 12) or may be placed above the build area platform 12 (e.g., radiative heating of the build material layer surface). In other examples, the source 36' of radiation 40 may be positioned to apply radiation 40 to the layer 30 of polymeric or polymeric composite build material particles 16 immediately after the fusing agent 28 (alone or with the dielectric agent 26) has been applied thereto. In the example shown in FIG. 4, the source 36' of radiation 40 is attached to the side of the applicators 24A, 24B which allows for patterning and heating/exposing to radiation 40 in a single pass.

The source 36, 36' of radiation 40 may emit radiation 40 having wavelengths ranging from about 800 nm to about 1 mm. As one example, the radiation 40 may range from about 800 nm to about 2 μm. As another example, the radiation 40 may be blackbody radiation with a maximum intensity at a wavelength of about 1100 nm. The source 36, 36' of radiation 40 may be infrared (IR) or near-infrared light sources, such as IR or near-IR curing lamps, IR or near-IR light emitting diodes (LED), or lasers with the desirable IR or near-IR electromagnetic wavelengths.

The source 36, 36' of radiation 40 may be operatively connected to a lamp/laser driver, an input/output temperature controller, and temperature sensors, which are collectively shown as radiation system components 50. The radiation system components 50 may operate together to control the source 36, 36' of radiation 40. The temperature recipe (e.g., radiation exposure rate) may be submitted to the input/output temperature controller. During heating, the temperature sensors may sense the temperature of the polymeric or polymeric composite build material particles 16, and the temperature measurements may be transmitted to the input/output temperature controller. For example, a thermometer associated with the heated area can provide temperature feedback. The input/output temperature controller may adjust the source 36, 36' of radiation 40 power set points based on any difference between the recipe and the real-time measurements. These power set points are sent to the lamp/laser drivers, which transmit appropriate lamp/laser voltages to the source 36, 36' of radiation 40. This is one example of the radiation system components 50, and it is to be understood that other radiation source control systems may be used. For example, the controller 46 may be configured to control the source 36, 36' of radiation 40.

In the examples of the method 100, 200, 300 and the system 10 disclosed herein, the build material particles 16 may be a polymeric build material or a polymeric composite build material. As used herein, the term "polymeric build material" may refer to crystalline or semi-crystalline polymer particles. As used herein, the term "polymeric composite build material" may refer to composite particles made up of polymer and ceramic.

Examples of semi-crystalline polymers include semi-crystalline thermoplastic materials with a wide processing window of greater than 5° C. (i.e., the temperature range between the melting point and the re-crystallization temperature). Some specific examples of the semi-crystalline thermoplastic materials include polyamides (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.). Other examples of crystalline or semi-crystalline polymers suitable for use as the build material particles 16 include polyethylene, polypropylene, and polyoxomethylene (i.e., polyacetals). Still other examples of suitable build material particles 16 include polystyrene, polycarbonate, polyester, polyurethanes, other engineering plastics, and blends of any two or more of the polymers listed herein.

Any of the previously listed crystalline or semi-crystalline polymer particles may be combined with ceramic particles to form the polymeric composite build material particles 16. Examples of suitable ceramic particles include metal oxides, inorganic glasses, carbides, nitrides, and borides. Some specific examples include alumina ($Al_2O_3$), glass, silicon mononitride (SiN), silicon dioxide ($SiO_2$), zirconia ($ZrO_2$), titanium dioxide ($TiO_2$), or combinations thereof. The amount of ceramic particles that may be combined with the crystalline or semi-crystalline polymer particles may depend on the materials used and the 3D part to be formed. In one example, the ceramic particles may be present in an amount ranging from about 1 wt % to about 20 wt % based on the total weight of the polymeric composite build material particles 16.

In some examples, the polymeric or polymeric composite build material 16 may be in the form of a powder. In other examples, the polymeric or polymeric composite build material 16 may be in the form of a powder-like material, which includes, for example, short fibers having a length that is greater than its width. In some examples, the powder may be formed from, or may include, short fibers that may, for example, have been cut into short lengths from long strands or threads of material.

The polymeric or polymeric composite build material particles 16 may have a melting point or softening point ranging from about 50° C. to about 400° C. Depending upon the composition of the composite, the melting or softening point may be higher or lower. As an example, the polymeric or polymeric composite build material particles 16 may be a polyamide having a melting point of about 180° C.

The polymeric or polymeric composite build material particles 16 may be made up of similarly sized particles or differently sized particles. In the examples shown herein (FIGS. 2A-2E and FIG. 4), the polymeric or polymeric composite build material 16 includes similarly sized particles. In an example, the average particle size of the polymeric or polymeric composite build material particles 16 ranges from about 2 μm to about 200 μm. In another example, the average particle size of the polymeric or polymeric composite build material particles 16 ranges from about 20 μm to about 90 μm. In still another example, the average particle size of the polymeric or polymeric composite build material particles 16 is about 60 μm.

In some examples, the polymeric or polymeric composite build material 16, in addition to the polymer particles (and in some cases ceramic particles), an antioxidant, a brightener, a charging agent, a flow aid, or a combination thereof.

Antioxidant(s) may be added to the polymeric or polymeric composite build material 16 to prevent or slow molecular weight decreases of the polymeric or polymeric composite build material 16 and/or may prevent or slow discoloration (e.g., yellowing) of the polymeric or polymeric composite build material 16 by preventing or slowing oxidation of the polymeric or polymeric composite build material 16. In some examples, the antioxidant may be a radical scavenger. In these examples, the antioxidant may include IRGANOX® 1098 (benzenepropanamide, N,N'-1,6-hexanediylbis(3,5-bis(1,1-dimethylethyl)-4-hydroxy)), IRGANOX® 254 (a mixture of 40% triethylene glycol bis(3-tert-butyl-4-hydroxy-5-methylphenyl), polyvinyl alcohol and deionized water), and/or other sterically hindered phenols. In other examples, the antioxidant may include a phosphite and/or an organic sulfide (e.g., a thioester). In an example, the antioxidant may be included in the polymeric or polymeric composite build material 16 in an amount ranging from about 0.01 wt % to about 5 wt % based on the total weight of the polymeric build material 16.

Brightener(s) may be added to the polymeric or polymeric composite build material 16 to improve visibility. Examples of suitable brighteners include titanium dioxide ($TiO_2$), zinc oxide (ZnO), calcium carbonate ($CaCO_3$), zirconium dioxide ($ZrO_2$), aluminum oxide ($Al_2O_3$), silicon dioxide ($SiO_2$), and combinations thereof. In some examples, a stilbene derivative may be used as the brightener. In these examples, the temperature(s) of the 3D printing process may be below a threshold temperature above which the stilbene derivative may become unstable. In an example, the brightener may be included in the polymeric or polymeric composite build material 16 in an amount ranging from about 0.01 wt % to about 10 wt % based on the total weight of the polymeric or polymeric composite build material 16.

Charging agent(s) may be added to the polymeric or polymeric composite build material 16 to suppress tribocharging. Examples of suitable charging agents include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 wt % to less than 5 wt % based upon the total weight of the polymeric or polymeric composite build material 16.

Flow aid(s) may be added to improve the coating flowability of the polymeric or polymeric composite build material 16. Flow aids may be particularly beneficial when the particles of the polymeric or polymeric composite build material 16 are less than 25 µm in size. The flow aid improves the flowability of the polymeric or polymeric composite build material 16 by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900). In an example, the flow aid is added in an amount ranging from greater than 0 wt % to less than 5 wt % based upon the total weight of the polymeric or polymeric composite build material 16.

Also in some examples of the method 100, 200, 300 and the system 10 disclosed herein, and as mentioned above, a fusing agent 28 separate and distinct from the dielectric agent 26 may be used. As an example, a separate and distinct fusing agent 28 may be used when the radiation absorber is not compatible with the dielectric agent 26. Additionally, a separate and distinct fusing agent 28 may be used to pattern the remaining region of a layer that is not to exhibit the dielectric property and/or the piezoelectric property (even if the dielectric agent 26 includes the radiation absorber).

The fusing agent 28 includes the radiation absorber. The radiation absorber may be the carbon black pigment and may be dispersed by the polymeric dispersant as described above. The carbon black pigment and the polymeric dispersant may also be included in the fusing agent 28 in any of the amount described above (except based on the total weight of the fusing agent 28 rather than the dielectric agent 26).

The fusing agent 28 may also include water (e.g., deionized water), co-solvent(s), surfactant(s), anti-kogation agent(s), or combinations thereof. The co-solvent, the surfactant, and/or the anti-kogation agent may include any of the examples mentioned above in reference to the dielectric agent 26. The total amount of the co-solvent(s) may range from about 15 wt % to about 30 wt % based on the total weight of the fusing agent 28. The total amount of the surfactant(s) may range from about 0.5 wt % to about 2 wt % based on the total weight of the fusing agent 28. The total amount of the anti-kogation agent(s) may range from greater than 0.20 wt % to about 0.65 wt %, based on the total weight of the fusing agent 28. Water may make up the balance of the fusing agent 28.

In some examples, the fusing agent 28 may also include antimicrobial agent(s), chelating agent(s), or combinations thereof.

Suitable antimicrobial agents that may be included in the fusing agent 28 include biocides and fungicides. Example antimicrobial agents may include the NUOSEPT™ (Troy Corp.), UCARCIDE™ (Dow Chemical Co.), ACTICIDE® B20 (Thor Chemicals), ACTICIDE® M20 (Thor Chemicals), ACTICIDE® MBL (MIT/BIT and Bronopol) (Thor Chemicals), AXIDE™ (Planet Chemical), NIPACIDE™ (Clariant), blends of CMIT/MIT under the tradename KATHON™ (Dow Chemical Co.), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from Dow Chemical Co.).

In an example, the fusing agent 28 may include a total amount of antimicrobial agents that ranges from about 0.05 wt % to about 1 wt %. In an example, the antimicrobial agent(s) is/are a biocide(s) and is/are present in the fusing agent 28 in an amount of about 0.25 wt % (based on the total weight of the fusing agent 28).

Chelating agents (or sequestering agents) may be included in the fusing agent 28 to eliminate the deleterious effects of heavy metal impurities. Examples of chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the fusing agent 28 may range from greater than 0 wt % to about 2 wt % based on the total weight of the fusing agent 28. In an example, the chelating agent(s) is/are present in the fusing agent 28 in an amount of about 0.04 wt % (based on the total weight of the fusing agent 28).

While the examples disclosed herein utilize the dielectric agent 26 in combination with the fusing agent 28 or a dielectric agent 26 that includes a radiation absorber, it is to be understood that some examples of the method 100, 200, 300 may utilize a binder fluid instead of the fusing agent or instead of the radiation absorber. With the binder fluid, the method may involve: applying a polymeric or polymeric composite build material 16; selectively applying a dielectric agent 26 on at least a portion 32 of the polymeric or polymeric composite build material 16, the dielectric agent 26 including a dielectric material having an effective relative permittivity ($\varepsilon_r$) value ranging from 1.1 to about 10,000; and selectively applying a binder fluid on the at least the portion 32 of the polymeric or polymeric composite build material 16 to form a region 44 of a layer 42 of a 3D part, wherein the region 44 exhibits a dielectric property, a piezoelectric property, or a combination thereof.

In this example, the build material 16 may be any of the examples previously described, and the dielectric agent 26 may be any of the examples that do not include the radiation absorber.

Also in this example, the binder fluid may be any fluid that contains a binder that is capable of adhering or binding the patterned build material particles 16 together, either upon contact with the particles 16 or after exposure to curing or heating. An example of the binder fluid includes water, a co-solvent, a binder, and an additive selected from the group consisting of a surfactant, a biocide, etc. Any of the previously described co-solvents, surfactants, and biocides may be used, in similar amounts except that the total amount would be with respect to the binder fluid. In an example, the binder fluid includes 2-methyl-1,3-propanediol and 2-pyrollidinone as co-solvents and TERGITOL™ 15-S-7 and CAPSTONE® FS-35 as surfactants.

As mentioned above, the binder may be any polymeric binder that is capable of adhering or binding the patterned build material particles 16 together, either upon contact with the particles 16 or after exposure to curing or heating. In an example, the binder includes latex polymer particles. As used herein, the term "latex" refers to a polymer that is capable of being dispersed in an aqueous medium. The latex may be a colloidal dispersion of polymer particles in the liquid vehicle of the binder fluid.

The latex may be formed of high $T_g$ hydrophilic component(s) and low $T_g$ hydrophilic component(s), and may have any suitable morphology. The components may be defined in relation to each other (i.e., the high $T_g$ hydrophilic component(s) have a $T_g$ higher than the low $T_g$ hydrophilic component(s), and the low $T_g$ hydrophilic component(s) have a $T_g$ lower than the high $T_g$ hydrophilic component(s). In some examples, the high $T_g$ hydrophilic component(s) have a $T_g$ higher than 25° C. In other examples, the high $T_g$ hydrophilic component(s) have a $T_g$ higher than 45° C. In some examples, the low $T_g$ hydrophilic component(s) have a $T_g$ lower than 25° C. In other examples, the low $T_g$ hydrophilic component(s) have a $T_g$ lower than 5° C.

Examples of low $T_g$ monomers that may be used to form the hydrophobic component include C4 to C8 alkyl acrylates or methacrylates, styrene, substituted methyl styrenes, polyol acrylates or methacrylates, vinyl monomers, vinyl esters, or the like. Some specific examples include methyl methacrylate, butyl acrylate, butyl methacrylate, hexyl acrylate, hexyl methacrylate, ethyl acrylate, ethyl methacrylate, propyl acrylate, propyl methacrylate, 2-ethylhexyl acrylate, 2-ethylhexy methacrylate, hydroxyethyl acrylate, lauryl acrylate, lauryl methacrylate, octadecyl acrylate, octadecyl methacrylate, isobornyl acrylate, isobornyl methacrylate, stearyl methacrylate, ethylene glycol dimethacrylate, diethylene glycol dimethacrylate, triethylene glycol dimethacrylate, tetrahydrofurfuryl acrylate, alkoxylated tetrahydrofurfuryl acrylate, 2-phenoxyethyl methacrylate, benzyl acrylate, ethoxylated nonyl phenol methacrylate, cyclohexyl methacrylate, trimethyl cyclohexyl methacrylate, t-butyl methacrylate, n-octyl methacrylate, tridecyl methacrylate, isodecyl acrylate, dimethyl maleate, dioctyl maleate, acetoacetoxyethyl methacrylate, diacetone acrylamide, pentaerythritol tri-acrylate, pentaerythritol tetra-acrylate, pentaerythritol tri-methacrylate, pentaerythritol tetra-methacrylate, divinylbenzene, styrene, methylstyrenes (e.g., α-methyl styrene, p-methyl styrene), vinyl chloride, vinylidene chloride, vinylbenzyl chloride, acrylonitrile, methacrylonitrile, N-vinyl imidazole, N-vinylcarbazole, N-vinyl-caprolactam, combinations thereof, derivatives thereof, or mixtures thereof.

The heteropolymer may be formed of at least two of the previously listed monomers, or at least one of the previously listed monomers and a high $T_g$ hydrophilic monomer, such as an acidic monomer. Examples of acidic monomers that can be polymerized in forming the latex polymer particles include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2 acrylamido-2-methyl-1-propanesulfonic acid, combinations thereof, derivatives thereof, or mixtures thereof. Other examples of high $T_g$ hydrophilic monomers include acrylamide, methacrylamide, monohydroxylated monomers, monoethoxylated monomers, polyhydroxylated monomers, or polyethoxylated monomers.

In the heteropolymers disclosed herein, the low $T_g$ hydrophobic component(s) make up from about 65% to about 100% of the polymer, and the high $T_g$ hydrophilic component(s) make up from about 0.1% to about 35% of the polymer.

The binder may be present in the binder fluid in an amount ranging from about 20 wt % to about 45 wt %.

To further illustrate the present disclosure, an example is given herein. It is to be understood this example is provided for illustrative purposes and is not to be construed as limiting the scope of the present disclosure.

EXAMPLE

An example of the dielectric agent was prepared. The example dielectric agent included barium titanate nanoparticles, with an average particle size of about 100 nm, as the dielectric material. The barium titanate nanoparticles used were added to the example dielectric agent in the form of a water-based dispersion. The general formulation of the example dielectric agent is shown below in Table 1, with the wt % of each component that was used. The weight percentage of the barium titanate dispersion represents the % actives, i.e., the total barium titanate solids present in the final formulation, and does not account for any fluid that may be in the barium titanate dispersion. The dye was included for visibility of the printed dielectric agent, and may or may not be included in the examples disclosed herein.

TABLE 1

| Ingredient | Specific component | Example dielectric agent (wt %) |
|---|---|---|
| Dielectric material | Barium titanate dispersion | 21.94 |
| Co-solvent | 2-pyrrolidone | 20.00 |
| Surfactant | SURFYNOL ® 465 | 0.40 |
| Dye | Acid blue 9 | 0.20 |
| Water | | Balance |

The example dielectric agent was used to print two example parts on polyamide 12 (PA 12) build material. For the first example part, the example dielectric agent was printed in 4 printing passes to obtain a total weight of the example dielectric material of 7.7 wt %, based on the total weight of the first example part. For the second example part, the example dielectric agent was printed in 4 printing passes to obtain a total weight of the example dielectric material of 14.3 wt %, based on the total weight of the second example part. For both example parts, an example fusing agent, including carbon black pigment as the radiation absorber, was applied during the third printing pass. For both example parts, radiation was applied in two passes (i.e., radiation events) with each printing pass for a total of eight radiation events.

Figure 5:
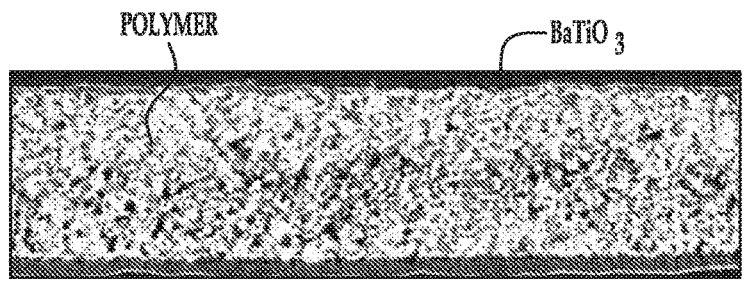
FIG. 5 shows an x-ray image of a portion of an example part taken along its vertical height, where the example part was a disc having a thickness or height (top to bottom) of about 2 mm and a diameter of about 10 mm that was printed according to an example of a method for 3D printing disclosed herein.
Figure 6:
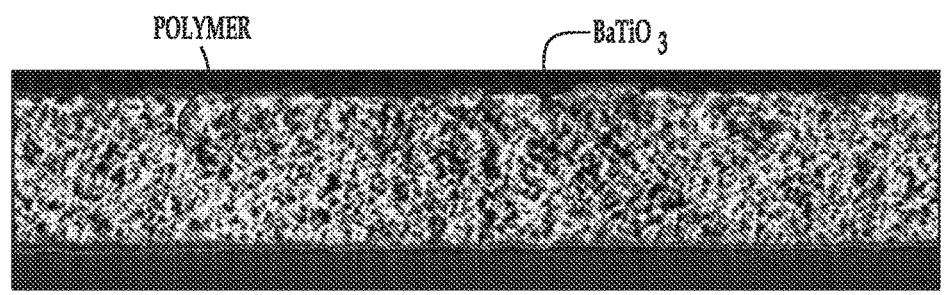
FIG. 6 shows an x-ray image of a portion of another example part taken along its vertical height, where the example part was a disc having a thickness or height (top to bottom) of about 2 mm and a diameter of about 10 mm that was printed according to another example of a method for 3D printing disclosed herein.

The first example part contained barium titanate in amount of about 7.7 wt %, based on the total weight of the first example part. FIG. 5 shows an x-ray image of the first example part with a thickness or height (top to bottom) of 2 mm. The second example part contained barium titanate in amount of about 14.3 wt %, based on the total weight of the second example part. FIG. 6 shows the x-ray image of the second example part, with a thickness or height (top to bottom) of 2 mm. The barium titanate (labeled as $BaTiO_3$ in FIGS. 5 and 6) in the example parts imparts the dielectric property to the example parts, and the polymer (labeled as polymer in FIGS. 5 and 6) in the example parts contributes to the mechanical strength of the example parts. The lower contone level resulted in less agglomeration of the barium titanate, which may be desirable for improved mechanical strength because the material is embedded more within the polymer.

Figure 7:
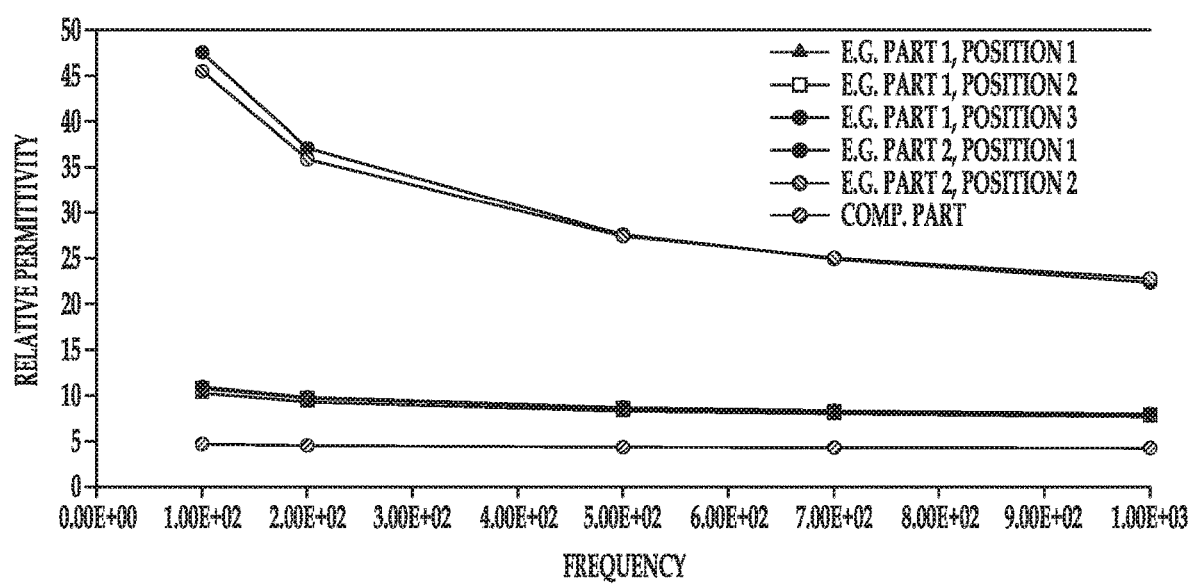
FIG. 7 is a graph depicting the permittivity response measurements of example and comparative parts as a function of frequency, with the relative permittivity values shown on the y-axis and the frequencies (in Hz) shown on the x-axis.

The permittivity responses of each of the example parts were measured at 2 or 3 positions at different frequencies. The permittivity responses of a comparative part, printed using the same build material and fusing agent but with no dielectric agent, were also measured at the same frequencies. The results of the permittivity response measurements are shown in FIG. 7. In FIG. 7, the relative permittivity values are shown on the y-axis and the frequencies at which the relative permittivity values were measured (in Hz) are shown on the x-axis. As shown in FIG. 7, the relative permittivity values of the example parts are greater than the relative permittivity values of the comparative part. Thus, FIG. 7 demonstrates that the example parts exhibited the dielectric property, while the comparative part did not.

It is to be understood that the ranges provided herein include the stated range and any value or sub-range within the stated range. For example, from 1.1 to about 10,000 should be interpreted to include not only the explicitly recited limits of from 1.1 to about 10,000, but also to include individual values, such as about 1.5, about 2, about 2.5, about 3.75, about 5, about 8, about 150, about 2,000, etc., and sub-ranges, such as from about 1.4 to about 800, from about 1.5 to about 8,000, from about 2 to about 10, from about 3 to about 50, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A method for three-dimensional (3D) printing, comprising:
    applying a polymeric or polymeric composite build material;
    selectively applying a dielectric agent on at least a portion of the polymeric or polymeric composite build material, the dielectric agent having a potential hydrogen (pH) value ranging from about 7 to about 9 and including a dielectric material having an effective relative permittivity ($\varepsilon_r$) value ranging from 1.1 to about 10,000;
    based on a 3D object model, selectively applying a fusing agent on the at least the portion of the polymeric or polymeric composite build material; and
    exposing the polymeric or polymeric composite build material to radiation to fuse the at least the portion of the polymeric or polymeric composite build material to form a region of a layer of a 3D part, wherein the region exhibits a dielectric property, a piezoelectric property, or a combination thereof.

2. The method as defined in claim 1 wherein the effective $\varepsilon_r$ value ranges from about 2 to about 80.

3. The method as defined in claim 1 wherein the effective $\varepsilon_r$ value ranges from about 3 to about 10.

4. The method as defined in claim 1 wherein the region exhibits the dielectric property, the piezoelectric property, or the combination at a frequency ranging from greater than 0 Hz to about 80 GHz.

5. The method as defined in claim 1 wherein:
    the at least the portion is less than all of the polymeric or polymeric composite build material;
    the method further comprises selectively applying, based on the 3D object model, the fusing agent on an other portion of the polymeric or polymeric composite build material; and during the exposing, the other portion of the polymeric or polymeric composite build material fuses to form a remaining region of the layer of the 3D part.

6. The method as defined in claim 5 wherein the remaining region does not exhibit a dielectric property or a piezoelectric property.

7. The method as defined in claim 1 wherein the dielectric material is selected from the group consisting of barium titanate nanoparticles, lead zirconium titanate nanoparticles, silicon dioxide nanoparticles, silicon nitride nanoparticles, aluminum oxide nanoparticles, zirconium oxide nanoparticles, titanium oxide nanoparticles, tantalum pentoxide nanoparticles, barium strontium titanate nanoparticles, strontium titanate oxide nanoparticles, and combinations thereof.

8. The method as defined in claim 1 wherein the dielectric material has an average particle size ranging from about 10 nm to about 150 nm.

9. The method as defined in claim 1 wherein the dielectric material is present in the dielectric agent in an amount ranging from about 2 wt % to about 50 wt %, based on a total weight of the dielectric agent.

10. The method as defined in claim 1 wherein the dielectric agent further includes:
water;
a co-solvent; and
a surfactant.

11. A method for three-dimensional (3D) printing, comprising:
applying a polymeric or polymeric composite build material;
selectively applying a dielectric agent on a portion of the polymeric or polymeric composite build material, the dielectric agent having a potential hydrogen (pH) value ranging from about 7 to about 9 and including a dielectric material having an effective relative permittivity ($\varepsilon_r$) value ranging from 1.1 to about 10,000;
based on a 3D object model, selectively applying a fusing agent on a section of the polymeric or polymeric composite build material, the section including at least the portion;
exposing the polymeric or polymeric composite build material to radiation to fuse the section of the polymeric or polymeric composite build material to form a layer of a 3D part, wherein the portion of the polymeric or polymeric composite build material forms a region of the layer, and wherein the region of the layer exhibits a dielectric property, a piezoelectric property, or a combination thereof; and
repeating the applying of the polymeric or polymeric composite build material, the selectively applying of the dielectric agent, the selectively applying of the fusing agent, and the exposing, wherein the repeating forms the 3D part including the layer.

12. The method as defined in claim 11 wherein the effective $\varepsilon_r$ value ranges from about 3 to about 10.

13. A dielectric agent, consisting of:
a dielectric material having an effective relative permittivity ($\varepsilon_r$) value ranging from 1.1 to about 10,000;
water;
a co-solvent;
a surfactant;
a radiation absorber in an amount ranging from 0 wt % to about 12 wt %, based on a total weight of the dielectric agent; and
an anti-kogation agent in an amount ranging from 0 wt % to about 0.65 wt %, based on the total weight of the dielectric agent;
wherein a potential hydrogen (pH) value of the dielectric agent ranges from about 7 to about 9.

14. The dielectric agent as defined in claim 13 wherein the effective $\varepsilon_r$ value ranges from about 3 to about 10.

15. A method for three-dimensional (3D) printing, comprising:
first, applying a polymeric or polymeric composite build material;
then, based on a 3D object model, selectively applying a fusing agent on at least a portion of the polymeric or polymeric composite build material;
then, selectively applying a dielectric agent on the at least the portion of the polymeric or polymeric composite build material, the dielectric agent having a potential hydrogen (pH) value ranging from about 7 to about 9 and including a dielectric material having an effective relative permittivity ($\varepsilon_r$) value ranging from 1.1 to about 10,000; and then
exposing the polymeric or polymeric composite build material to radiation to fuse the at least the portion of the polymeric or polymeric composite build material to form a region of a layer of a 3D part, wherein the region exhibits a dielectric property, a piezoelectric property, or a combination thereof.

* * * * *